Feb. 20, 1968   J. J. DA ROLD ETAL   3,370,166
OBJECT DETECTOR AND CONTROL SYSTEM EMPLOYING SAME
Filed Feb. 21, 1966   4 Sheets-Sheet 1
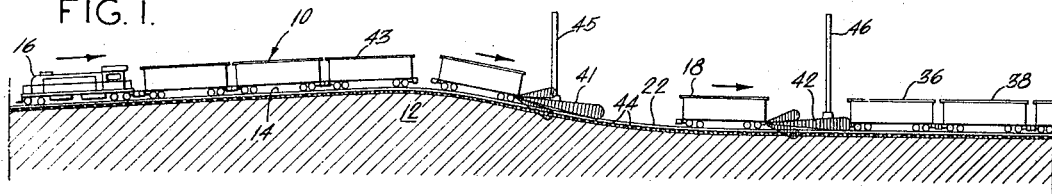
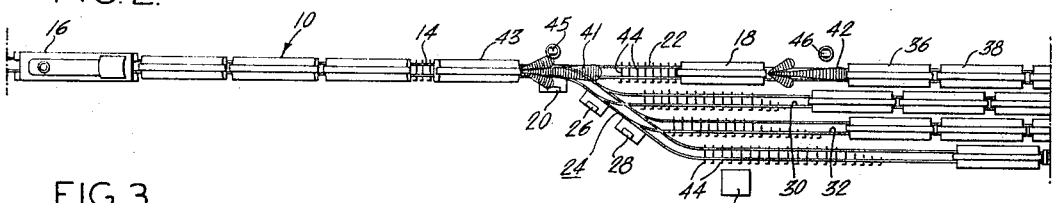
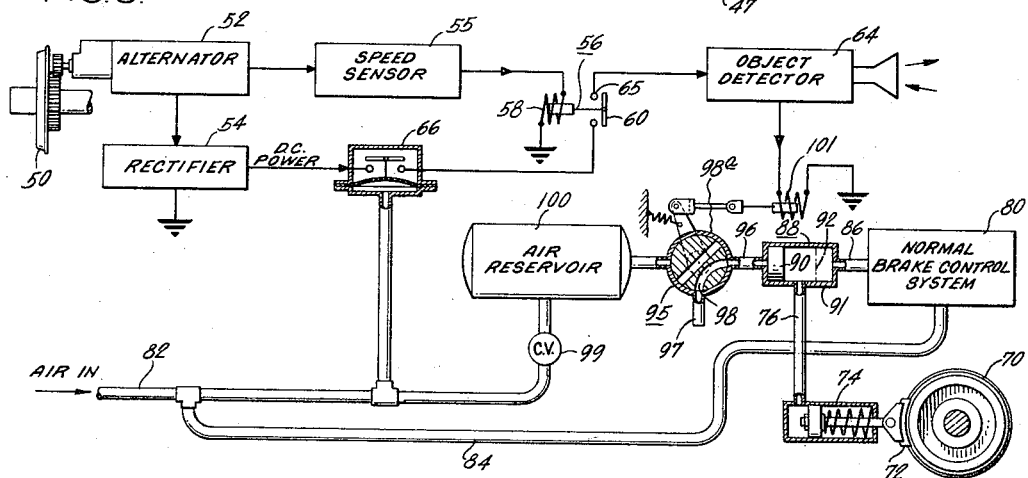
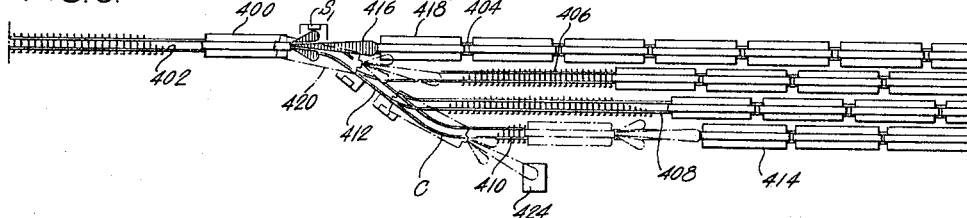
INVENTORS:
JAMES J. DaROLD
RUDOLPH F. TREVISIN
BY Howson & Howson
ATTYS.

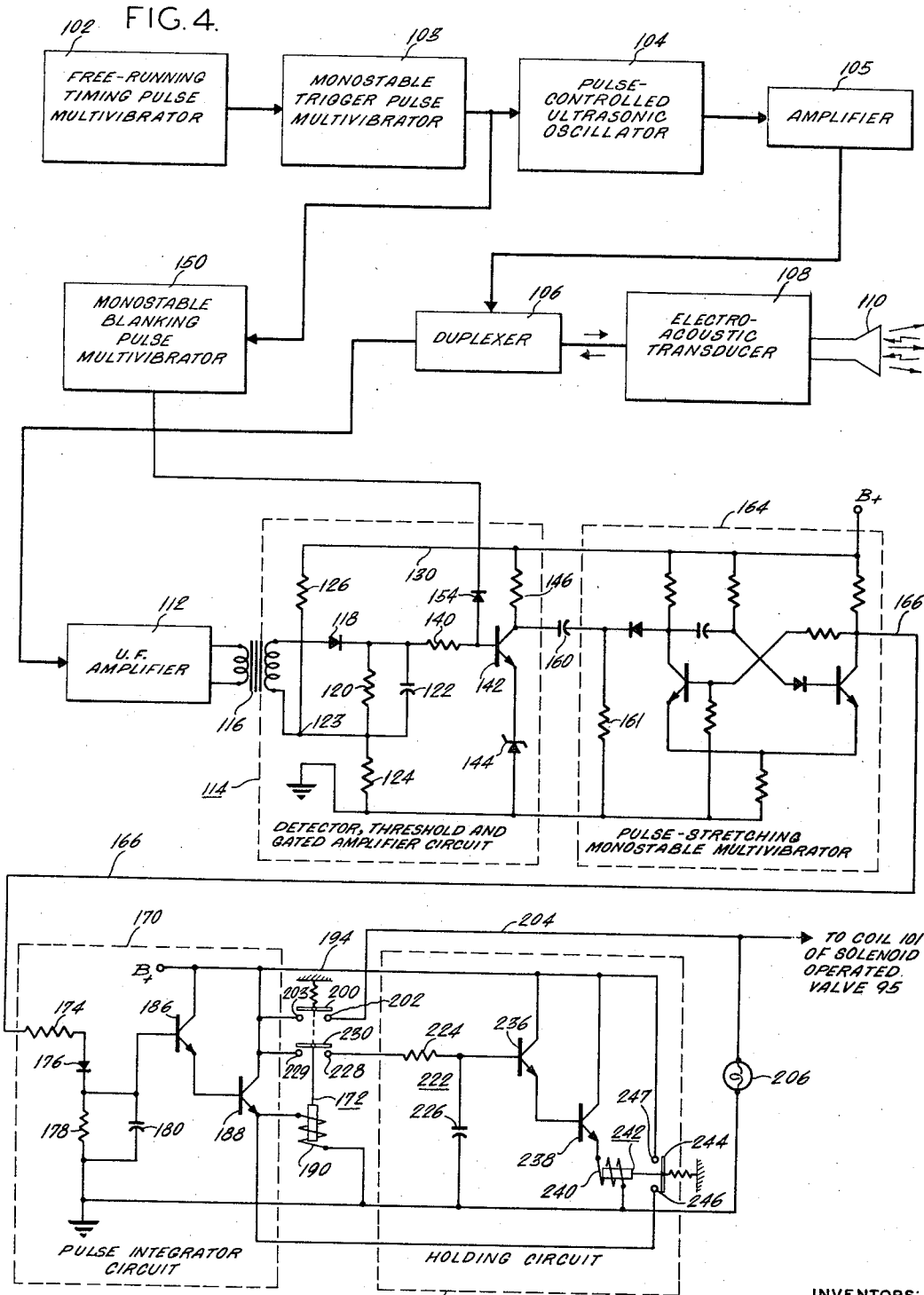

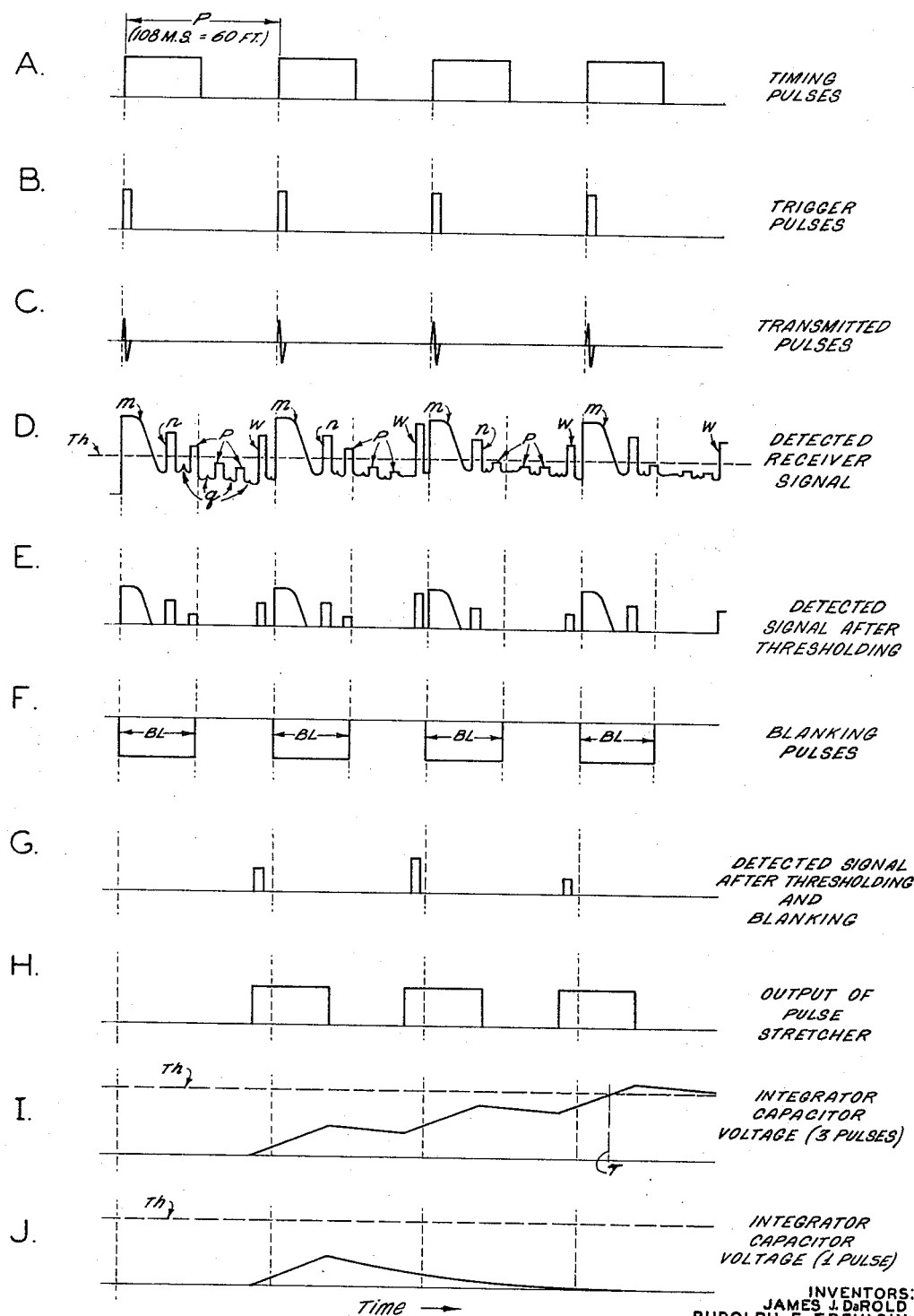

Feb. 20, 1968  J. J. DA ROLD ETAL  3,370,166
OBJECT DETECTOR AND CONTROL SYSTEM EMPLOYING SAME
Filed Feb. 21, 1966  4 Sheets-Sheet 4
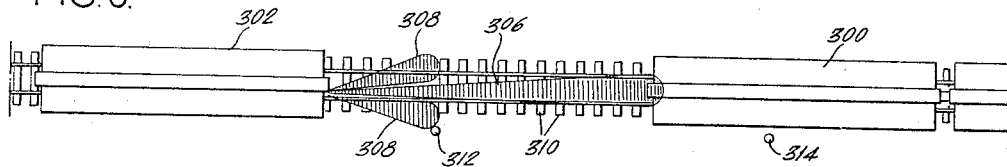
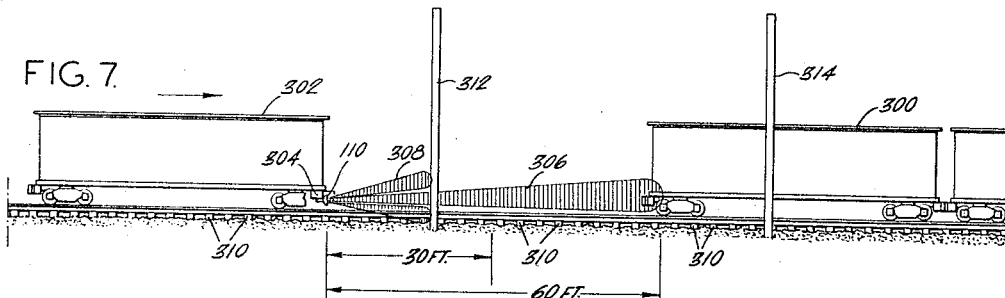
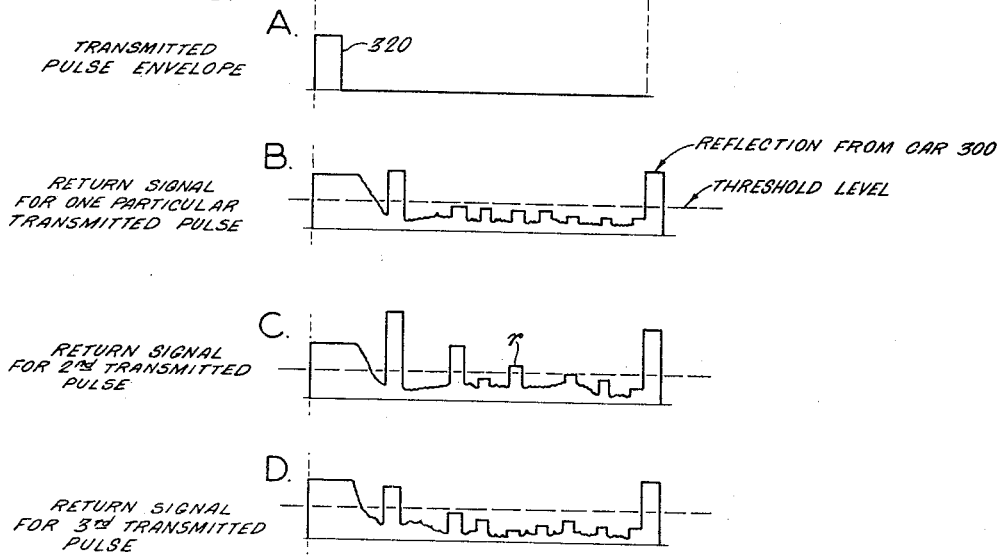
INVENTORS:
JAMES J. DaROLD
RUDOLPH F. TREVISIN
BY Howson & Howson
ATTYS.

United States Patent Office 3,370,166
Patented Feb. 20, 1968

3,370,166
OBJECT DETECTOR AND CONTROL SYSTEM EMPLOYING SAME
James J. Da Rold, Huntington Station, and Rudolph F. Trevisin, Huntington, N.Y., assignors to American Bosch Arma Corporation, Garden City, N.Y., a corporation of New York
Filed Feb. 21, 1966, Ser. No. 529,081
6 Claims. (Cl. 246—182)

ABSTRACT OF THE DISCLOSURE

An automatic object detecting and braking system for railroad cars employing an ultrasonic echo apparatus. The echo receiver has blanking circuitry for eliminating unwanted echoes from nearby objects while permitting detection of objects at a predetermined range. False detection is avoided by producing a single pulse during each operating cycle in which an echo is detected and integrating successive pulses to produce a braking control signal. If the braking control signal persists for a predetermined time, the braking is continued in the absence of received echoes due to operation of a holding circuit.

---

This invention relates to apparatus for detecting the presence of a remote object and to systems employing such apparatus for control purposes, especially for controlling the automatic braking of vehicles. In its more particular forms it relates to object detectors and systems employing the same for providing automatic braking of a vehicle such as a railroad car when it approaches within a predetermined distance of another vehicle in front of it, so as to prevent unduly severe impacting of one vehicle against the other, for example during the assembling of freight trains by "humping" operations or the like.

Apparatus is known in the prior art for sensing the distance to objects by transmitting time-spaced pulses of energy toward the objects, receiving reflections of the pulses from the objects, and deriving indications of the times required for travel of the pulses to and from the objects. There are a number of significant drawbacks to many types of such systems when used in certain applications. For example, some such systems require complicated electrical circuitry for indicating the presence of target objects within a predetermined range. One relatively simple arrangement for providing an indication of object distance is to render the receiver sensitive only during a predetermined interval of limited duration following each pulse transmission, during which interval reflections are received only from objects within a predetermined corresponding range of distances; the occurrence of receiver output signals then indicates that an object is located within this predetermined range of distances.

However further problems arise in connection with such reflection-type object-detecting systems when it is desired that only one particular type or class of target object produce indicating or control signals. For example, such a situation arises where it is desired to control the automatic braking of vehicles such as railroad cars. In the making up of railroad trains it is common to give a railroad car on a feeder track an initial rolling velocity by pushing it over a hump or hill, or by giving it an initial push with a locomotive on a flat track, after which it rolls freely to a ladder track and thence to a particular branch track as controlled by the operation of appropriate switches in a switchyard. If the car is given sufficient initial velocity to assure that it will roll far enough onto the desired branch track, unduly severe impacts commonly occur between the rolling car and an immediately-preceding stationary car already on the branch track, this effect being particularly difficult to avoid because of unavoidable differences in the rolling velocities of the cars and in the distances which they travel before impact. Apparatus would therefore be desirable which would automatically apply the brakes of the rolling car when it approached to within a predetermined range of distances from the car next ahead of it against which it is to impact, so as to slow the rolling car to a speed for which only mild impact will occur, at which point the brakes would be released by a suitable speed sensor on the rolling car to permit the latter car to roll gently against the car ahead.

In such systems it would also be desirable that the apparatus employed to control braking be capable of responding quickly to the presence in front of it of the car against which it will be impacted, but it is also important that the system be substantially immune to actuation by the presence of other reflective objects along its path such as railroad ties, track-side structures, switching equipment, or a railroad car other than that against which the rolling car is to be impacted which may momentarily occupy a position generally in front of the rolling car as it maneuvers and turns in travel to its destination. The detailed natures of these and other interfering effects which can arise in a specific application of the invention are described fully hereinafter. Similar or analogous problems arise in other systems to which the invention is applicable.

Accordingly it is an object of the invention to provide new and useful apparatus for sensing the presence of remote objects within a predetermined range of distances.

Another object is to provide such apparatus which is capable of producing control signals selectively in response to the presence of remote objects of a particular class or type.

Another object is to provide new and useful apparatus and a system employing same, which is simple and reliable in operation.

A further object is to provide such an apparatus and system for providing automatic braking of a vehicle carrying the apparatus when the apparatus-carrying vehicle is within a predetermined range of distance from another vehicle in its path.

Another object is to provide an apparatus and system suitable for mounting on the front of a railroad car and operative to brake said car when said car has approached to within a predetermined distance of the car ahead of it on the same track.

It is also an object to provide an apparatus and system of the latter type which is relatively simple and inexpensive, but reliable to produce continued braking only in response to a car or similar reflective object on the same track despite the presence, along or adjacent the track, of other reflective objects producing reflections tending to interfere with the desired braking operation.

These and other objects of the invention are achieved by the provision of a system utilizing an object detector comprising a pulse-echo object detection system which transmits pulses and receives reflections thereof from remote objects. The receiving arrangement includes blanking means for rendering the receiver insensitive during blanking intervals immediately following each transmitted pulse to eliminate the effects of reflections from nearby objects within a predetermined distance shorter than the distance for which initial target detection is desired. This prevents undesired operation of the system in response to reflections from such nearby objects, including relatively small objects which, because they are so close to the pulse-echo system, tend to produce very strong spurious signals at the receiver. Also employed are integrating means which respond to signals produced by the receiver to produce a control signal only in response to reflections which persist over the time of a predetermined plurality of transmitted pulses. This militates against undesired operation of the system in response to reflections from objects which are more remote than the predetermined distance corresponding to the blanking interval, and which may be small compared with the object to be detected but are nevertheless capable of producing unusually strong reflections in response to one or a small number of transmitted pulses when at a specific critical angle with respect to the transmitter; this critical angle may occur momentarily during motion of the pulse-echo system.

In addition there is employed a holding circuit which responds to the control signal produced by the integrating means and, once the control signal has persisted for a predetermined time, causes it to persist thereafter even if output from the integrating means disappears. This arrangement permits the system to produce a control signal quickly in response to the presence of the desired target opject in the preselected range, for example so that a braking control system can be operated promptly, and enables the control signal to continue even after the distance to the target object decreases to within the blanked-out distance, whereby enough time to accomplish the desired amount of braking is provided. However if the control signal was initially produced in response to an undesired object such as a track-side structure or a car on another track which is only momentarily in a position to cause reflections large enough to produce a control signal, the holding circuit will not be operated and the control signal and the braking operation will occur only momentarily and will be discontinued promptly when continued relative motion between the vehicle and the object causes the reflections to become weaker and the output signals from the integrating means to disappear.

Preferably also the system includes a threshold circuit for removing all receiver output signals substantially smaller than those which the desired target object will produce when within the desired initial-detection range, and a pulse-forming circuit supplied from the threshold circuit which produces only a single pulse of predetermined electrical energy for each transmitted pulse when operated by received signals greater than the threshold level. Preferably each pulse produced by the pulse-forming circuit is at least as long as the sensitive interval of the receiver and no longer than the repetition period of the transmitted pulses less the length of the sensitive interval. This increases the reliability of the system and especially of the integrating means, as will be described more fully hereinafter.

More particularly, in a preferred form of the invention an utrasonic pulse-echo object-detecting system is mounted on a railroad car which is to be rolled along a track having one or more switches to permit diversion of the rolling car to a particular branch track on which the train of which it is to be a part is to be assembled. The antenna pattern of the object-detecting system is directed forwardly of the car. When the rolling car approaches to within a predetermined distance $D_{max}$, such as 60 feet, from a car already on the same branch track the object-detecting system produces a control signal to apply the brakes so as to slow the rolling car to a safe speed for impacting against the car ahead. When the car has been braked to this safe speed a speed sensor on the rolling car releases the brakes. Receiver blanking means eliminates receiver signals produced during an initial blanking interval after each transmitted pulse, corresponding to a distance $D_{min}$ such as 30 feet ahead of the rolling car, and reflections from objects in the range $D_{min}$ ahead of the vehicle are thereby prevented from operating the vehicle brakes. Interfering reflections received after the blanking interval and before the next transmitted pulse which are of low strength are eliminated by a threshold circuit, and those which exceed the threshold level for only one or very few successive pulses are prevented from operating the brakes by an integrating circuit which produces a control signal to operate the brakes only after reflections greater than the threshold level have been received in response to a plurality of immediately-successive transmitted pulses, e.g. three. Those interfering reflections which occur sufficiently often to cause the integrator to produce a brake control signal may nevertheless persist for only a relatively short time, i.e. a fraction of a second, and when they disappear will release the brakes promptly. However, reflections from the car on the branch track against which the equipment-carrying car is to be impacted will persist for a time sufficient to operate a holding circuit, which holds the brakes on thereafter even when the integrator output ceases, so that when the rolling car approaches to within the blanked-out distance from the car ahead the brakes will nevertheless continue to be applied to slow the car to the desired speed. In this way prompt, reliable and adequate automatic braking is provided.

These and other objects and features of the invention will be more readily understood from a consideration of the following description taken in connection with the accompanying drawings, in which:

FIGURES 1 and 2 are schematic plan and side views, respectively, to which reference will be made in explaining the application of the invention to railroad car humping operations;

FIGURE 3 is a schematic diagram of a brake-control system to which the present invention is applicable;

FIGURE 4 is an electrical circuit diagram, partly in block form, of a preferred embodiment of the invention;

FIGURE 5 is a graphical representation illustrating certain electrical waveforms produced in the operation of the invention in one of its forms;

FIGURES 6 and 7 are schematic plan and side views of a railroad car and track system to which reference will be made in explaining how certain types of interfering signals may arise;

FIGURE 8 comprises graphical representations to which reference will be made in further explaining the operation of the invention; and FIGURE 9 is a schematic plan view of a railroad car and track system to which reference will be made in explaining how certain other types of interfering signals may arise.

The invention will be described with particular reference to use in a railroad car humping system such as is represented schematically in FIGURES 1 and 2. A train of railroad cars 10 is pushed up a hill or hump 12 in the feeder track 14 by a switching locomotive 16, generally at a very slow rate such as less than four miles per hour, each car in the train reaching the crest of the hill and rolling down the other side through one or more switches to a particular branch track. For example car 18 may roll freely through a switch 20 to a branch track 22. As shown in FIGURE 2, the feeder track 14 in which the hump 12 is formed typically communicates with an oblique ladder track 24 which, in addition to switch 20, may include a plurality of other switches such as 26 and 28 feeding other branch tracks such as 30 and 32, respectively, for example. In this way the desired train of cars can be assembled on the branch tracks by rolling the cars from the feeder track separately down the slope of the hump and switching each car to its appropriate branch track.

As indicated in FIGURE 1, in general when any individual car such as 18 is caused to roll freely onto its appropriate branch track there will be one or more other stationary cars such as 36 and 38 already on the same branch track. It is intended that each newly-arriving car on branch track impact the one immediately ahead of it so that the cars will coupled together but, in view of unavoidable differences in the rolling velocities of different cars reaching the branch tracks as well as the different positions of the stationary cars on the various branch tracks, in previously existing systems the impact between the rolling car and the fixed or stationary car has often been unduly severe, resulting in potential damage to the cars and their contents. On the other hand, if the velocity of the rolling cars is too small they may not reach their destination, or may do so at such a slow speed as not to coupled properly to the preceding car.

In the system now to be described each rolling car is given sufficient initial velocity to assure that, if it is allowed to roll freely throughout its travel or is braked only momentarily, it will reach its destination with more than sufficient velocity. When it has moved to within a predetermined distance of the stationary car against which it is to impact, an object-detecting pulse-echo system mounted on the front of the rolling car detects the presence of the stationary car and applies the brakes of the rolling car until the latter car slows down to a predetermined optimum speed for impacting, after which it rolls into contact with the preceding car with substantially the optimum relatively-low velocity. The curves 41 and 42 in FIGURES 1 and 2 represent the radiation patterns of the object-detecting systems on cars 43 and 18, respectively. Reflections which tend to interfere with the desired automatic operation of the brakes may be produced by railroad ties such as 44, utility poles such as 45 and 46 and buildings such as 47 disposed along or adjacent the tracks.

FIGURE 3 illustrates the general overall braking system of the invention. The equipment shown is mounted on each of the railroad cars to be distributed to the various branch tracks, preferably low on the front of the car. One of the car wheels 50 is mechanically coupled to drive an alternator 52 the electrical output of which is passed through a conventional rectifier 54 to produce DC power for operating the electrical portions of the system. Another output of the alternator 52 is supplied to a speed sensor 55, which produces a DC output to operate single-pole, single-throw relay 56 when the velocity of the railroad car rises above a predetermined minimum value $V_{min}$, such as four miles per hour for example. Various conventional forms for such speed sensors are known, which may operate upon the frequency of the alternator output or the magnitude of the alternator voltage, or on a combination of both. The contacts of relay 56 are normally open, but are closed by the above-described current through coil 58 thereof. Preferably, the sensor 55 and relay 56 are such that "drop-out" of the relay, i.e., reopening of its contacts, occurs at a velocity $V'_{min}$ slightly less than $V_{min}$, e.g. at three miles per hour.

Closing of the pole 60 of relay 56 to its contacts 65 causes DC power from rectifier 54 to be supplied to an object detector 64, provided that pressure switch 66 is also then close. The latter pressure switch is open in response to pneumatic pressure supplied thereto from the usual pneumatic train pipe, so long as the railroad car is coupled in a train. However when the car is decoupled from the train, as when it is to begin its free roll during the humping operation, the contacts of pressure switch 66 close and, when the speed of the rolling car increases to above $V_{min}$, DC power will be supplied to the object detector 64 to render it operative. Whenever the speed of the car falls below $V'_{min}$ the object detector 64 is again rendered inoperative.

The war wheel 70 represents one wheel of the railroad car to which controlled braking is to be applied. For this purpose there is provided the usual brake shoe 72 and brake cylinder 74 for urging the shoe against the wheel when pressure is supplied to the brake cylinder by way of pressure line 76. In order to provide normal operation of the brakes when the car is part of the coupled train there is provided a normal brake control system 80 such as is commonly provided on railroad cars, and which is supplied with operating pressure from the usual train pipe 82 which is pressurized only when the car is coupled to others so as to complete the connection to the pressure source in the train engine. When pressure from train pipe 82 is so supplied to inlet line 84 of the normal brake control system 80, the latter system produces no output pressure at its outlet line 86; however when pressure at line 82 disappears, as when the car in question is decoupled from the train, system 80 operates to apply pressure developed at its outlet line 86 to brake cylinder pressure line 76, in the present case by way of a pressure valve 88.

Pressure valve 88 comprises a pressure-sealing piston 90 which is readily slidable longitudinally in cylinder 91. Piston 90 occupies its extreme left position, as shown in full line, when its right face is at a positive pressure with respect to its left face, and under the opposite conditions of pressure thereon occupies the extreme right-hand position 92 shown in dotted line. Outlet line 86 is connected to the right end of the cylinder 91 containing piston 90 and the brake cylinder inlet line 76 is connected near the center of the length of the cylinder 91, between the two extreme positions of the piston. Accordingly, when the normal brake control system 80 applies a positive pressure to the right-hand side of cylinder 91, the piston 90 thereof slides to the left to allow the pressure to be transmitted to brake-cylinder pressure line 76 as required for operation of the brakes. The free sliding of the piston 90 to the left described above is permitted by virtue of the fact that the left-hand end of cylinder 91 communicates with a solenoid valve 95 by way of interconnecting line 96, the solenoid valve 95 in its normal, non-actuated position providing connection only between line 96 and a vent opening 97, as shown by the position of the port 98 in solenoid 95.

However when the railroad car is decoupled from the train for humping purposes, the connection of the pressurized train pipe 82 is broken and pressure is therefore no longer supplied thereto; the normal brake control system 80 and the lines connected thereto are then bled substantially to atmosphere by an operator or by mechanical means, before the car enters its freely-rolling travel. This also causes check valve 99 to close and to retain a positive pressure in the air reservoir 100 for the automatic brake system. Under these conditions there is normally a small residual positive pressure on the right of the slide 90 so that it is held to the left of the connection to brake-cylinder pressure line 76. However, when the object detector 64 produces a control current through the coil 101 of solenoid valve 95 in response to the repetitive detection of a reflective object in front of the rolling car in a distance range $D_{min}$ to $D_{max}$ (e.g. 30 to 60 feet), the solenoid valve 95 is actuated to provide connection between the air reservoir 100 and the interconnecting line 96 by way of port 98a inside the solenoid valve. This applies a positive pressure to the left side of piston 90, causing it to slide to its right-hand position 92 and thereby permitting positive pressure from air reservoir 100 to be applied through line 76 to brake cylinder 74, and to operate the brakes on the car wheel 70. When the control current through coil 101 disappears, solenoid valve 95 returns to its normal condition in which line 96 is connected to vent 97, at which time the pressure in the brake cylinder 74 is relieved by backflow through line 76, cylinder 91, line 96 and vent 97, thereby terminating the braking action.

In the usual operation of the system including the inventive portions thereof, such termination of the control current through coil 101 occurs when the rolling car has approached within about 60 feet of the car against which it is to be impacted, has been braked by the automatic operation described above, and has experienced a drop in rolling velocity to below the velocity $V'_{min}$, typically about three miles per hour, at which time speed sensor 55 permits relay 56 to open and remove electrical operating power from the object detector 64. This terminates the control current through coil 101 with consequent releasing of the brakes. The car then rolls gently into the one ahead as desired.

FIGURE 4 shows an object detector constructed in accordance with the invention for providing the above-indicated braking control current to solenoid-valve coil 101 and including means for discriminating against interference with the desired operation by various common types of interfering signals, includng signals produced by the presence of reflective objects other than the preceding car against which the equipment-carrying car is to be impacted.

The object detector comprises a free-running timing pulse multivibrator 102 which produces a periodically-recurrent square wave such as is represented at A of FIGURE 5. The repetition period P of the wave is set at a value equal to that required for ultrasonic waves to propagate to, and to return from, objects located at the maximum range $D_{max}$ at which it is desired to sense the presence of the preceding car. For example, if the effective maximum range of the equipment is to be about 60 feet, the timing pulse repetition period may be about 108 milliseconds. The leading edge of each timing pulse is used to actuate a monostable trigger pulse multivibrator 103, which responds ot produce a short trigger pulse in response to each such actuation, as represented at B of FIGURE 5. In the present example a trigger pulse duration of about one millisecond is typical.

The trigger pulse from multivibrator 103 is supplied to a pulse-controlled ultrasonic oscillator 104 to cause it to produce output pulses of ultrasonic frequency, such as 18 kilocycles per second for example, during each applied trigger pulse. The ultrasonic pulses are passed through a suitable amplifier 105 and duplexer 106 to the control elements of an electro-acoustical transducer 108 causing the latter transducer to radiate pulses of ultrasonic energy directed generally forwardly of the vehicle which carries the equipment, by means of a suitable directional horn 110 attached thereto. Such transmitted signals are represented at C of FIGURE 5, it being understood that in general each ultrasonic pulse will contain many more cycles of ultrasonic wave energy than are shown in the figure. The horn 110 also selectively receives reflections of the transmitted pulses which return to it along generally the same direction as the track in front of the car. However it will be understood that the horn 110 will, in general, not have ideal directional characteristics and will permit a certain degree of divergence of the transmitted beam of ultrasonic energy as well as a certain amount of side-lobe transmission and reception, so that reflections are also received in some degree from railroad ties in the bed of the track and from other objects such as poles or buildings adjacent the track other than the immediately-preceding car which it is desired to detect.

Reflections of the ultrasonic pulses received by horn 110 of electro-acoustic transducer 108 are supplied by way of duplexer 106 to the input of ultrasonic frequency (U.F.) amplifier 112. The duplexer 106 may be of any of a number of known types and serves the usual purpose of channeling the outgoing pulses primarily to the electro-acoustic transducer and the received pulses primarily to the U.F. amplifier 112. The U.F. amplifier 112 may be of conventional form, and serves to increase the magnitude of the received, reflected ultra-sonic-energy pulses.

The output of the amplifier 112 is supplied to the input of the detector, threshold, and gated amplifier circuit 114. Thus the output of the amplifier 112 may be supplied to the primary of a coupling transformer 116, the secondary of which is connected to a detector circuit comprising a diode 118 in series with the parallel combination of a resistor 120 and a capacitor 122. The lower end of this detector circuit is connected to the center point 123 on a voltage divider formed by resistors 124 and 126, the latter divider being connected between ground and the positive supply lead 130.

The detector circuit operates conventionally to detect the ultrasonic frequency signal, and produces unidirectional voltage variations varying in accordance with the strengths of the acoustic pulses reflected from various objects. One possible form for the resultant detected signal is shown at D of FIGURE 5. The broad pulses such as $m$ are produced by the interfering effects of the operation of the pulse transmitter during each pulse transmission; the narrow high-amplitude pulses such as $n$ may be produced by reflections from utility poles disposed along the track sides, and the smaller pulses such as $p$ by reflections from railroad ties in the track bed. The smaller signals in the intervals such as $q$ may be produced by general background noise, such as whistles, rumbling and minor reflections. The high-amplitude pulses $w$ may be produced by the desired reflections from the immediately-preceding car on the same branch track.

The output signals from the detector are applied by way of series resistor 140 to the base of a transistor 142, the emitter of which is connected to ground through a zener diode 144 and the collector of which is connected to the positive supply line 130 by way of resistor 146. Transistor 142 is of the NPN type and the zener diode 144 is poled so that its anode is grounded. Resistors 124 and 126 operate in conjunction with the zener diode 144 to provide the thresholding function. The zener diode maintains the emitter of transistor 142 at a predetermined fixed positive potential, such as 6.8 volts, with respect to ground. Accordingly the transistor 142 conducts heavily, or is turned on, when its base voltage is about 7 volts or higher with respect to ground. The received and detected signals supplied to the base of transistor 142 are riding on a DC component determined by the ratio of resistors 124 and 126, and the threshold level $V_{th}$ of the detected signal required to turn on transistor 142 is therefore the threshold base voltage of the transistor 142 (e.g. 7 volts) minus the DC bias voltage provided by resistors 124 and 126. The ratio of the values of resistors 124 and 126 can be changed to provide the threshold level for detected signals desired in any particular application.

In addition, the base of transistor 142 is supplied with negative blanking pulses from monostable blanking pulse multivibrator 150 by way of diode 154 throughout a predetermined time interval immediately following each transmitted pulse. Monostable blanking pulse multivibrator 150 is triggered by the pulses shown at FIGURE 5B from trigger pulse multivibrator 102. The blanking pulses are represented in the waveform at F of FIGURE 5, and in the present example each blanking pulse has a duration equal to about one-half the repetition period of the transmitted pulses and is of sufficient magnitude to prevent conduction in transistor 142 during the blanking interval and thereby to block transmission of signals through transistor 142.

As represented at D in FIGURE 5, the threshold level $Th$ for the detected signals is set so that lesser interfering signals, such as small reflections from ties and general background noise, are insufficient to exceed the threshold level. The waveform at E of FIGURE 5 illustrates the signals in excess of the threshold level which would be produced by the detected signal shown at D. It is noted that a number of signals exceed the threshold level during the earlier halves of the interpulse periods. However these are unable to actuate transistor 142 and are effectively eliminated due to the blanking pulses as described above, so that the only signals effective to operate the transistor 142 are the desired target pulses shown at G of FIGURE 5.

Turning on of transistor 142 in response to a pulse due to reflection from the desired target object applies a trigger pulse, by way of a differentiating circuit comprising coupling capacitor 160 and resistor 161, to pulse-stretching monostable multivibrator 164 to cause it to go through one cycle of its operation. This multivibrator 164 may comprise a conventional circuit of the type utilizing a pair of cross-coupled transistors and produces one substantially rectangular pulse on its output lead 166 for each cycle of its operation, this pulse having a duration which is preferably at least as long as the sensitive period of the receiver but no longer than the repetition period P less the duration of the sensitive period; in the present embodiment the output pulse of multivibrator 164 has a duration substantially equal to the duration of the sensitive period of the receiver, as represented in FIGURE 5 at H. This arrangement is such that once the multivibrator 164 is triggered it does not return to its original state until after the corresponding sensitive period is over and hence can only be triggered once per sensitive period; however, multivibrator 164 always returns to its original triggerable state before the next following sensitive period of the receiver so that it is always prepared to respond to the reception of signals in the desired range from $D_{min}$ to $D_{max}$ (e.g. 30 to 60 feet).

The output pulses from monostable multivibrator 164 are supplied over lead 166 to the input of an integrator circuit shown in the dotted rectangle 170. The function of this circuit is to produce initial operation of normally-open, double-pole, single-throw relay 172 only after a predetermined plural number of pulses have been applied to the integrator circuit during immediately successive sensitive periods of the receiver. More particularly, the output pulses of multivibrator 164 are supplied by way of resistor 174 across a circuit consisting of the series combination of diode 176 and a resistor 178 which is in parallel with capacitor 180. This type of circuit is known in the electronic art for other purposes, and operates so that capacitor 180 charges progressively in a stepwise fashion in response to successive input pulses thereto. The charging of capacitor 180 in response to three successive pulses from multivibrator 164 is illustrated in FIGURE 5. As shown, during each of the output pulses from multivibrator 164 the voltage across the capacitor 180 increases at a relatively rapid rate due to the passage of forward current through diode 176, and decreases only slowly in the intervening intervals due to the relatively high value of resistor 178 and capacitor 180. In this embodiment it requires three successive output pulses from multivibrator 164 to cause the voltage across capacitor 180 to rise above the threshold level $Th$ indicated by the dotted line at I of FIGURE 5; this occurs at the time indicated by T in the figure. The latter threshold voltage is that required to turn on the transistor 186 and the transistor 188 sufficiently to pass an operating current through relay coil 190 of relay 172.

More particularly, the base of transistor 186 is connected directly to the high-potential side of capacitor 180 and its collector is directly connected to the B+ supply line 194. The emitter of transistor 186 is connected directly to the base of transistor 188, and the emitter of the latter transistor is connected to ground by way of the coil 190 of relay 172. The collector of transistor 188 is direct coupled to the B+ power supply line 194. The two transistors 186 and 188 provide power amplification and impedance matching. Threshold voltage $Th$ is provided primarily by the characteristic of relay 172, which operates only when the current through its coil 192 has risen above a predetermined threshold value. The number of pulses applied to the input of integrator 170 required to produce the threshold current for operating relay 172 is illustrated as three in the present example, but can be adjusted to any desired number by appropriate selection of the capacity of capacitor 180.

Because only one pulse of fixed, predetermined electrical energy is applied to the integrator circuit 170 in any sensitive period of the receiver, the relay 172 performs reliably its function of operating only when supplied with at least three pulses produced during three different immediately-successive sensitive periods of the receiver, as desired.

The waveform at J of FIGURE 5 illustrates operation in response to a lone input pulse to the integrator circuit 170. As shown, the capacitor 180 charges once in response to such pulse but insufficiently to reach the threshold voltage level, and thereafter decays again toward zero without attaining a value sufficient to operate the transistors 186 and 188 or the relay 172.

The contacting pole 200 of relay 172 is normally open from its contacts 202 and 203. However, upon the occurrence of current through relay coil 190, pole 200 closes to contacts 202 and 203 and thereby applies the B+ voltage to the coil of the solenoid-valve coil 101 by way of lead 204. An indicator lamp 206 may also be connected between lead 204 and ground to show when the brakes are being applied. Accordingly, as soon as the output of integrator circuit 170 rises above the threshold level of relay 172 the vehicle brakes are applied and the indicator lamp lighted.

However, with the portion of the circuit thus far described in detail it will be appreciated that as soon as the output of the integrator circuit falls below the level required to turn on transistor 186 the brakes will be released. This would mean that if the automatic application of the brakes occurred initially in response to the presence of an immediately-preceding car within the range $D_{min}$ to $D_{max}$, e.g. from 30 to 60 feet away, then when the distance between the equipment-carrying vehicle and the stationary vehicle ahead decreased below $D_{min}$ the brakes would be promptly released. In many cases this would not provide a sufficient time for the braking necessary to decrease the vehicle speed to that required for gentle impact. The holding circuit now described overcomes this difficulty.

The holding circuit 220 comprises a series resistance, shunt capacitance integrating network 222 made up of resistor 224 and capacitor 226 connected between ground and contact 228 of relay 172. Pole 230 is normally open but responds to current through relay coil 190 to close to contacts 228 and 229. Such closing causes positive supply potential to be supplied to contact 228, and capacitor 226 charges up in response thereto with a predetermined time constant determined by the product of the resistance of resistor 224 and the capacitance of capacitor 226. In the present example this time constant may be of the order of one or a few seconds.

The voltage thereby developed at the high potential side of capacitor 226 is directly supplied to the base of a transistor 236, the collector of which is directly connected to the positive supply line 194 and the emitter of which is directly connected to the base of another transistor 238. The latter transistor has its collector directly connected to the positive supply line 194 and its emitter connected to ground by way of the coil 240 of a single-pole, single-throw relay 242. Both of transistors 236 and 238 are of the NPN type. The pole 244 of relay 242 is normally open, but responds to current through relay coil 240 to close to contacts 246 and 247. The transistors 236 and 238 provide power amplification and in addition cooperate with relay 242 to provide a thresholding function, since the latter transistors are not turned on sufficiently to operate relay 242 until the voltage across capacitor 226 has had time to build up to a sufficiently high value, which in the present example may occur in about one second.

In operation, when integrator circuit 170 has operated relay 172 in response to a target object, capacitor 226 begins to charge and, if the target reflection recurs at a sufficiently high amplitude to continue to cause the integrator circuit to produce an output control signal for about a second, capacitor 226 charges sufficiently to turn on transistors 236 and 238 and produce an operating current through relay coil 240. This in turn closes relay arm 244 to relay contacts 246 and 247, connects the positive supply line to the coil 190, and holds or latches the relay 172 in its contact-closed position. The brakes and indicator lamp will therefore remain actuated even though the output of the integrator circuit 170 should thereafter disappear, which it normally will do when the distance between the equipment-carrying car and the stationary car ahead of it decreases below the minimum distance $D_{min}$, e.g. below 30 feet. This therefore enables the continued application of the brakes, as is required in many cases to slow the vehicle to the low speed desired for gentle impact. As described previously, when the equipment-carrying vehicle has been slowed to the desired speed, such as about three miles per hour, the speed sensor 55 then releases the brakes and allows the rolling car to impact gently against the car ahead.

It will be understood from the foregoing that the object detector described is only operative when it is supplied with B+ supply voltage by way of relay 56, and that this occurs only when the vehicle speed is above a predetermined range, as sensed by sensor 55.

The significance of the various target discriminating circuits described above will be more fully understood from a consideration of the following description of typical types of interfering signals which can arise in railroad-car humping procedures.

FIGURES 6 and 7 show top and side views of a portion of a typical branch track on which there is a stationary car 300 and a rolling car 302 approaching it along the track. The automatic braking system 304, including the above-described object detector and control circuits, is mounted on a lower portion of the front of the car 302. As shown, the radiation and reception pattern of the horn 110 discussed previously consists of a main forwardly-directed pencil-like beam 306 and a lesser side-lobe 308. Also shown are railroad ties 310, and a pair of utility poles 312 and 314 disposed along the side of the track. The situation is shown in which the rolling car 302 has just reached the effective maximum range $D_{max}$ of the system, in this case assumed to be 60 feet.

FIGURE 8 shows at A the detected envelope 320 of a pulse transmitted by equipment 304, and the waveforms at B, C and D of FIGURE 8 illustrate, respectively, the detected envelopes of the reflections of the transmitted pulse shown at A and of the next two transmitted pulses; these waveforms correspond to those produced by the detector circuit described above in connection with FIGURE 4. As described previously, all of the reflected, received signals produced by objects within 30 feet of the object detector are eliminated by blanking the gated amplifier in the receiver for a corresponding time interval following each transmitted pulse. During the sensitive interval of the receiver, corresponding to distances from 30 to 60 feet, the reflections from the stationary car 300 will remain above the threshold level indicated by the dotted line in graphs B, C and D of FIGURE 8 more than one second and, as described above, will therefore operate both the integrator circuit 170 and the holding circuit 220 to apply the brakes as desired.

Ideally, the only reflections occurring during the sensitive period which exceed the threshold level would be those due to reflections from the desired stationary car 300. However, it is possible for even a small object such as a railroad tie to produce a return reflection during a sensitive interval of the receiver which exceeds the threshold level in response to a given transmitted pulse; such a reflected signal is illustrated at $r$ of FIGURE 8C as occurring in response to the second transmitted pulse but not in response to the first or third transmitted pulse. This can occur because, at one critical angle between the horn of the object-detecting apparatus and the small reflecting object, the individual reflections from various parts of the object may add up in phase momentarily to produce an unusually strong reflection. However, this critical angle will be changed even by a small relative motion between object detector and reflecting object, and hence the tie reflection $r$ will exceed the threshold level for only one or possibly two transmitted pulses. As explained previously, even if such an anomalous strong interfering reflection should occur for one or two transmitted pulses, it will not be capable of operating the integrating circuit 170 in the receiver and hence will not operate the brakes of the rolling vehicle. This is true no matter at what portion of the travel of the rolling vehicle the anomalous signal appears.

Referring to FIGURE 9, the possibility of another type of interfering reflection will be appreciated. Here again there is illustrated a freely rolling car 400 shown in full in its position on feeder track 402, the latter track communicating with branch tracks 404, 406, 408 and 410 by way of ladder track 412. It is assumed that car 400 is to be impacted against stationary car 414 on branch track 410. However, when car 400 is approaching switch point $S_1$ the radiation pattern 416 of its object detector is directed toward the stationary car 418 on branch track 404 and may continue to be so directed while within 60 feet of car 418 for a large number of transmitted pulses, but generally for only a fraction of a second, after which it will turn to the dotted position 420 so that its radiated pattern no longer embraces car 418. Similarly, when car 400 has approached curve C its antenna pattern may be directed toward an adjacent building or other structure 424 for a substantial fraction of a second before it turns onto branch track 410. In both of these cases, strong reflections may be received which will exceed the threshold level in the receiver for a sufficient number of successive transmitted pulses to operate the integator circuit 170 and initiate braking. However, the braking will be only momentary, since the strong reflections will not persist long enough to cause operation of the holding circuit 220, which only operates after the control signal generated by the integrator circuit has persisted for a second. Accordingly, the rolling car may be slightly slowed by momentary braking at such points in its travel but, by starting the rolling car with a sufficient initial velocity, it will be able to reach its proper impacting position against stationary car 414 despite any such slight braking. As described previously, when the rolling car does approach within a predetermined distance of stationary car 414 the integrator circuit 170 and the holding circuit 220 will be actuated so that sufficient time to brake the car to a gentle impact will be afforded.

While the invention has been described with particular reference to specific embodiments in the interest of definiteness, it will be understood that it may be embodied in a variety of diverse forms differing from those specifically described without departing from the spirit and scope of the invention as defined by the appended claims.

We claim:
1. Object detecting apparatus, comprising:
transmitter means for generating and transmitting time-spaced pulses of energy;
receiver means for receiving reflections of said transmitted pulses from objects spaced from said transmitter means, and for producing receiver output signals in response thereto;
receiver blanking means for controlling said receiver means to eliminate output signals from said receiver means during blanking intervals of predetermined duration immediately following transmission of each of said pulses, said duration being shorter than the time between successive pulse transmissions thereby to provide sensitive intervals for said receiver means between successive pulse transmissions;
means responsive to output signals from said receiver means for producing only one output pulse for each of said sensitive intervals during which said output signals are produced;
signal integrating means supplied with said output pulses for initiating a control signal only in response to the recurrence of said output pulses during a predetermined plural number of immediately-successive ones of said sensitive intervals; and holding means responsive to said control signal for causing said control signal to persist in the absence of further output pulses once said control signal has existed for more than a predetermined minimum time.

2. The apparatus of claim 1, in which said sensitive interval is no greater than about one-half the repetition period of said transmitted pulses and in which said output pulses have a fixed duration at least as long as said sensitive interval of said receiver but shorter than said repetition period less the duration of said sensitive interval.

3. The apparatus of claim 1, in which said signal integrating means comprises a first electrical time-constant circuit and relay means actuated thereby, and in which said holding means comprises a relay latching circuit for latching said relay means and a second time-constant circuit responsive to said control signal to operate said relay latching circuit.

4. The apparatus of claim 3, comprising also threshold means for further controlling said receiver means, substantially to eliminate output signals from said receiver means which are of less than a predetermined magnitude.

5. In a system for automatically controlling the braking of a vehicle moving along a path to slow said vehicle after it approaches within a predetermined distance of the target object along said path, comprising transmitting means on said vehicle for transmitting pulses of acoustical wave energy along said path, receiver means on said vehicle for receiving reflections of said pulses from objects along said path, and brake control means for braking said vehicle in response to said received pulses, the combination therewith of:

means for eliminating from the output signals of said receiver means those signals produced in response to reflections received less than a predetermined minimum time after transmission of each of said pulses from said transmitter means, whereby said automatic braking can be initiated only in response to reflections from objects more than a predetermined minimum distance from said vehicle;

means responsive to said output signals for deriving output pulses of substantially equal energies, one of said output pulses being produced for each of said transmitted pulses which produces receiver output signals of greater than a predetermined magnitude;

means for integrating said output pulses to produce a control signal only in response to the occurrence of a plurality of immediately-successive output pulses supplied thereto, and for supplying said control signal to said brake control means, whereby only a target object producing repetitive strong reflections can initiate braking of said vehicle; and timing means responsive to the persistence of said control signal beyond a predetermined time period for continuing said braking of said vehicle even when said output pulses are discontinued, whereby braking of said vehicle is discontinued upon the discontinuance of reflections which have been received for less than said time period, but is continued after reception of reflections for more than said predetermined time period even after the distance between said vehicle and said target object has decreased below said predetermined minimum distance.

6. Apparatus adapted to be mounted on a first railroad car automatically to control the braking of said car as it moves along a track toward a second railroad car on the same track so that when said first car has moved to within a predetermined distance $D_{max}$ of said second car it is automatically slowed to a predetermined relatively low velocity suitable for harmless impacting of said first car against said second car, said apparatus comprising:

transmitter means for transmitting forwardly along said track from said first car a beam of periodically-recurrent time-spaced ultrasonic-energy pulses recurrent with a period slightly greater than that required for each of said pulses to propagate to and from said second car when said second car is at said predetermined distance $D_{max}$;

receiver means mounted with said transmitter means for receiving reflections of each of said transmitted pulses from objects along and adjacent said track and for producing in response thereto receiver output signals delayed with respect to each of said pulses by an amount proportional to the distance between said first car and said objects;

means for periodically blanking said receiver means to eliminate output signals from said receiver means produced during blanking intervals of predetermined duration each beginning with transmission of one of said transmitted pulses and terminating before transmission of the next of said transmitted pulses, thereby to leave a sensitive interval for said receiver means immediately following each of said blanking intervals;

threshold means for eliminating from said receiver output signals produced during said sensitive intervals those which are of less than a predetermined strength;

triggerable pulse generating means responsive to said receiver output signals for producing an output pulse of predetermined duration for each of said sensitive intervals during which said receiver output signals exceed said threshold level;

brake-control means responsive to an electrical control signal applied thereto for braking said first car;

pulse integrating means supplied with said output pulses for initiating application of said control signal to said brake-control means only when one of said output pulses has been produced for each of a plural number of immediately-preceding successive transmitter pulses, whereby spurious strong non-repetitive reflections from objects are prevented from braking said first car;

holding means responsive to the occurrence of said control signal for more than a predetermined time to continue application of a control signal to said brake-control means even after said output pulses no longer occur, whereby once braking of said first car has occurred for more than said predetermined time in esponse to reflections received from said second car during said sensitive intervals braking is caused to continue thereafter even when said last-named reflections are received during said blanking intervals; and means for discontinuing operation of said brakes when the velocity of said first car falls below a predetermined minimum velocity, thereby to permit said first car to impact gently against said second car.

References Cited

UNITED STATES PATENTS

| | | | |
|---|---|---|---|
| 3,166,278 | 1/1965 | Steinbach et al. | 246—182 |
| 3,197,771 | 7/1965 | Mintzer et al. | 343—7X |

RICHARD A. FARLEY, *Primary Examiner.*